(No Model.)
W. G. BENEDICT.
SMOKE GENERATOR FOR PROTECTING VEGETATION.
No. 247,740.                     Patented Oct. 4, 1881.
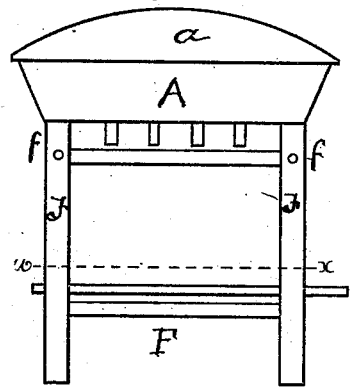
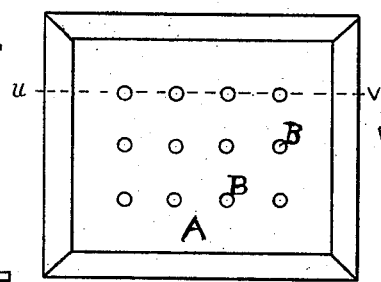
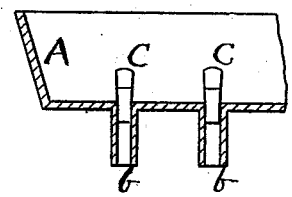
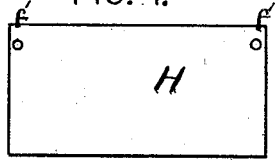
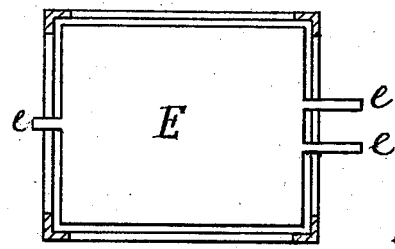
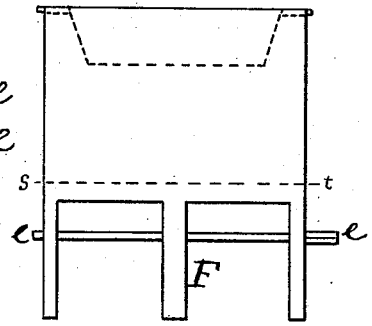
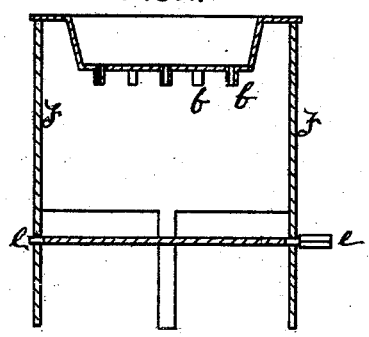
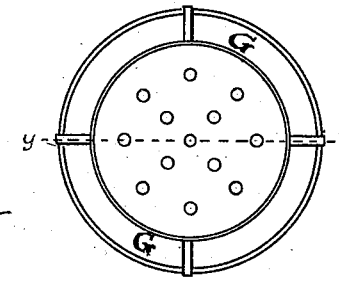
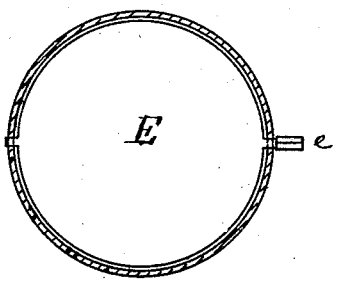
WITNESSES.
Frank P. Haines
Edward J. Tierney
INVENTOR.
Washington G. Benedict
N. PETERS. Photo-Lithographer, Washington, D. C.

UNITED STATES PATENT OFFICE.

WASHINGTON G. BENEDICT, OF BOSTON, MASSACHUSETTS.

SMOKE-GENERATOR FOR PROTECTING VEGETATION.

SPECIFICATION forming part of Letters Patent No. 247,740, dated October 4, 1881.

Application filed August 4, 1881. (No model.)

*To all whom it may concern:*

Be it known that I, WASHINGTON G. BENEDICT, a citizen of the United States of America, residing at Boston, in the county of Suffolk and State of Massachusetts, have invented certain new and useful Improvements in Smoke-Generators for Preserving Plants, Trees, &c., from the effects of frost and for destroying insects; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is known that by covering the lower strata of air near the ground with a volume of smoke damage from frost will be in great measure prevented, the smoke serving as a blanket, as it were, to protect vegetation and all tender buds or plants. I have devised a simple and cheap apparatus for producing smoke for such purposes, the nature of which invention will be fully hereinafter set forth.

In the drawings, Figure 1 is a side elevation of my smoke-generator; Fig. 2, a top-plan view of pan or reservoir; Fig. 3, a section of a portion of the pan on line $u\,v$, Fig. 2. Fig. 4 represents the wind-shield. Fig. 5 is a horizontal section of Fig. 1 on line $w\,x$. Figs. 6, 7, 8, and 9 show a cylindrical form of generator, Fig. 7 being a section on line $y\,z$; Figs. 8 and 9, a horizontal section on line $s\,t$, Fig. 6.

A is a pan or reservoir to contain coal-tar or other liquid or semi-fluid substances which burn with a dense smoke. The substance to be burned forms no part of my present invention, as I intend to make separate application for a patent for a compound for that purpose.

The bottom of pan A has a number of perforations, B, from which short pipes $b$ may extend downward. The perforations B may be closed, or partly closed, by plugs C, or by suitable valves or cocks. The pan and other attachments of the generator are suitably supported on frame F F.

A little distance below the pan A, and below the ends of pipes $b$, when such are used, a flat plate, E, of metal, is supported in the frame F. This plate is made reversible, and is supported by trunnions or lugs $e\,e$ resting on the frame. Where two lugs are used at one end the plate E can be turned over by slightly raising that end. A single pair of trunnions may be employed.

A cover, $a$, of sheet metal or similar material, is placed over the reservoir A.

The space between the bottom of the pipes $b$ and the plate E is shown to be open at the sides.

In case of a strong wind, I hang the shield H on one side, said shield being supported by pins $f\,f$, passing through holes $f'$.

The cylindrical generator is preferably surrounded with an outside casing, leaving an annular opening, as at G G, Fig. 8, through which the smoke can escape when permitted to do so.

When it is desired to burn coal in the apparatus a grate may be supplied under plate E. With loose fuel this is generally unnecessary.

The apparatus may be carried about the orchards by hand, or be provided with casters, or placed on wheels, like a wheelbarrow.

The operation of my device is as follows: When it is thought desirable to start a smoke in the garden, vineyard, or orchard, the generator is placed in a favorable location, the reservoir filled with coal-tar or similar liquid, and a fire kindled under plate E. The plugs C are withdrawn sufficiently to permit the fluid to drop slowly upon said plate, where its combustion produces a dense smoke, which escapes at the open sides. As the débris of this combustion accumulates upon plate E said plate is reversed, presenting a clean surface to the dropping liquid, while the side turned next the fire soon burns clean. In practice I find it well to reverse the burner-plate E about every half-hour. The reservoir will contain a supply of tar or other liquid to burn several hours.

For fumigating and killing insects the generator is placed under an infested tree or vine, and the smoke permitted to ascend through the branches. The inclosed form of generator, Figs. 6, 7, I consider best for this purpose, as by covering the annular space G around the reservoir the smoke is penned in and may be permitted to escape in dense volumes. It may be thus penned in while moving the apparatus from tree to tree. By confining smoke for a time and then removing the cover, permitting it to escape in puffs, I am enabled to get a denser volume of smoke for a limited time than if the smoke were allowed to escape as fast as generated. The dense smoke is of course more effective in smothering insects; also, this will render more effective the compound to be used in this generator for this purpose. I also prevent the waste of smoke while moving the generator from tree to tree.

To make the fumigation more effective in obstinate cases of insects, a sheet or covering may be drawn over the tree, thus more fully retaining the smoke and gases generated to accomplish this result.

Having thus described my invention, what I claim is—

1. A smoke-generator consisting, esssentially, of a reservoir, A, having means, substantially as described, for feeding out liquid in small quantities, and the burner-plate E, arranged in proximity thereto, substantially as described.

2. The combination of reservoir A, having apertures as described, and the reversible burner-plate supported beneath the same by suitable frame-work, as set forth.

3. The reversible burner-plate E, having two trunnions or lugs at one side and one at the other, combined with suitable frame-work and with perforated reservoir or pan, substantially as described.

4. The combination of perforated pan A, burner-plate E, frame F, and the wind-shield H, removable from the frame, substantially as described.

In testimony whereof I affix my signature in presence of two witnesses.

WASHINGTON G. BENEDICT.

Witnesses:
RUSON J. STONE,
LYMAN S. HAPGOOD.